(12) United States Patent
Taki et al.

(10) Patent No.: US 12,062,899 B2
(45) Date of Patent: Aug. 13, 2024

(54) BUNDLING SUSPENSION WIRE (71) Applicant: Fujikura Ltd., Tokyo (JP)

(72) Inventors: Go Taki, Chiba (JP); Ryo Inagaki, Chiba (JP); Ken Osato, Chiba (JP); Masayuki Ishioka, Chiba (JP)

(73) Assignee: Fujikura Ltd., Tokyo (JP)

( * ) Notice: Subject to any disclaimer, the term of this patent is extended or adjusted under 35 U.S.C. 154(b) by 19 days.

(21) Appl. No.: 17/925,143

(22) PCT Filed: Feb. 16, 2021

(86) PCT No.: PCT/JP2021/005668
§ 371 (c)(1),
(2) Date: Nov. 14, 2022

(87) PCT Pub. No.: WO2021/229879
PCT Pub. Date: Nov. 18, 2021

(65) Prior Publication Data
US 2023/0178972 A1 Jun. 8, 2023

(30) Foreign Application Priority Data

May 15, 2020 (JP) ................... 2020-085967

(51) Int. Cl.
*F16L 3/06* (2006.01)
*H02G 1/02* (2006.01)
*H02G 7/06* (2006.01)
*H02G 7/20* (2006.01)

(52) U.S. Cl.
CPC ............. *H02G 7/06* (2013.01); *H02G 1/02* (2013.01); *H02G 7/20* (2013.01)

(58) Field of Classification Search
CPC ... H02G 7/06; H02G 1/02; H02G 7/20; G02B 6/48
See application file for complete search history.

(56) References Cited

U.S. PATENT DOCUMENTS

| 2021/0273436 A1* | 9/2021 | Ciesielczyk | H02G 7/12 |
| 2021/0277931 A1* | 9/2021 | Bredl | H02G 7/06 |
| 2021/0288481 A1* | 9/2021 | O'Connell | H02G 1/02 |

FOREIGN PATENT DOCUMENTS

| JP | H07170628 A | 7/1995 |
| JP | H08-240753 A | 9/1996 |
| JP | 2000-166042 A | 6/2000 |
| JP | 2002-247724 A | 8/2002 |
| JP | 2006340512 A | 12/2006 |

(Continued)

OTHER PUBLICATIONS

International Search Report issued in corresponding International Application No. PCT/JP2021/005668, mailed Apr. 6, 2021, with translation (5 pages).

(Continued)

*Primary Examiner* — Amy J. Sterling
(74) *Attorney, Agent, or Firm* — Osha Bergman Watanabe & Burton LLP (57) ABSTRACT

A bundling suspension wire includes: a suspension wire that includes a supporting wire and a coat coating the supporting wire; a hanger member that is suspended from the suspension wire and into which a cable is configured to be inserted; and wire threading cords that are inserted into the hanger member.

5 Claims, 7 Drawing Sheets (56) References Cited

FOREIGN PATENT DOCUMENTS

| | | |
|---|---|---|
| JP | 2007178563 A | 7/2007 |
| JP | 2010-266501 A | 11/2010 |
| JP | 2017034825 A | 2/2017 |
| KR | 101135639 B1 | 4/2012 |

OTHER PUBLICATIONS

Written Opinion issued in corresponding International Application No. PCT/JP2021/005668, mailed Apr. 6, 2021 (3 pages).

* cited by examiner

Figure 7

BUNDLING SUSPENSION WIRE

CROSS REFERENCE TO RELATED APPLICATIONS

This application is a national stage of International Patent Application No. PCT/2021/005668 and claims priority to Japanese Patent Application No. 2020-085967 filed on May 15, 2020. The contents of these priority applications are incorporated herein by reference and regarded as a part of the description of this specification.

TECHNICAL FIELD

The present invention relates to a bundling suspension wire.

BACKGROUND

A suspension wire has a suspension wire having a coat, a cable through hole, hanger members disposed at a predetermined interval, and an introduction line disposed in the cable through hole (for example, refer to Patent Document 1). When an optical drop cable is laid on such a suspension wire, the optical drop cable is connected to the introduction wire and the introduction wire is pulled out from the cable through hole to insert the optical drop cable into the cable through hole.

Patent Document

Patent document 1: JP2007-178563A

However, in the above-mentioned suspension wire, when the optical drop cable is further laid after the first laying of the optical drop cable is completed, the introduction line must be re-inserted into the cable through hole. Therefore, a large amount of time may be required for the second and subsequent laying work (additional laying work).

SUMMARY

One or more embodiments of the present invention provide a bundling suspension wire capable of reducing the time required for cable following operation.

[1] A bundling suspension wire according to one or more embodiments of the present invention comprises: a suspension wire that includes a supporting wire and a coat coating the supporting wire; a hanger member that is suspended from the suspension wire and includes a through hole into which a cable can be inserted; and wire threading cords that are inserted into the through hole.

[2] In the above invention, the hanger member may include annular members that are spaced along an axial direction of the suspension wire and include the through hole, the annular members may be integrally formed with the coat of the suspension wire.

[3] In the above invention, the wire threading cords may be fixed to an inner circumference of the through hole.

[4] In the above invention, the wire threading cords may be fixed to a half area adjacent to the suspension wire in the inner circumference.

[5] In the above invention, the hanger member may include: a semi-tubular member that extends along an axial direction of the suspension wire and opens on an opposite side of the suspension wire; and semi-annular members that protrude from the semi-tubular member on the opposite side of the suspension wire and are spaced along an axial direction of the suspension wire, the semi-tubular member and the semi-annular members may be integrally formed with the coat of the suspension wire, and the wire threading cords may be fixed to an inner circumference of the semi-tubular member.

[6] In the above-described invention, the semi-tubular member may include grooves that extend along the axial direction of the suspension wire and are formed on the inner circumference of the semi-tubular member, and the grooves may include: first portions to which the wire threading cords are fixed; and second portions that have a fixing strength of the wire threading cord differ from a fixing strength of the wire threading cord of the first portion.

In a bundling suspension wire according to one or more embodiments of the present invention, since a plurality of wire threading cord is inserted into through hole of the hanger portion, using wire threading cord remaining in through hole of the hanger portion without being used in the first laying operation of the cable, it is possible to perform the cable following operation. Thus, it is possible to shorten the time required for cable following work.

DETAILED DESCRIPTION

First Embodiments

Figure 1:
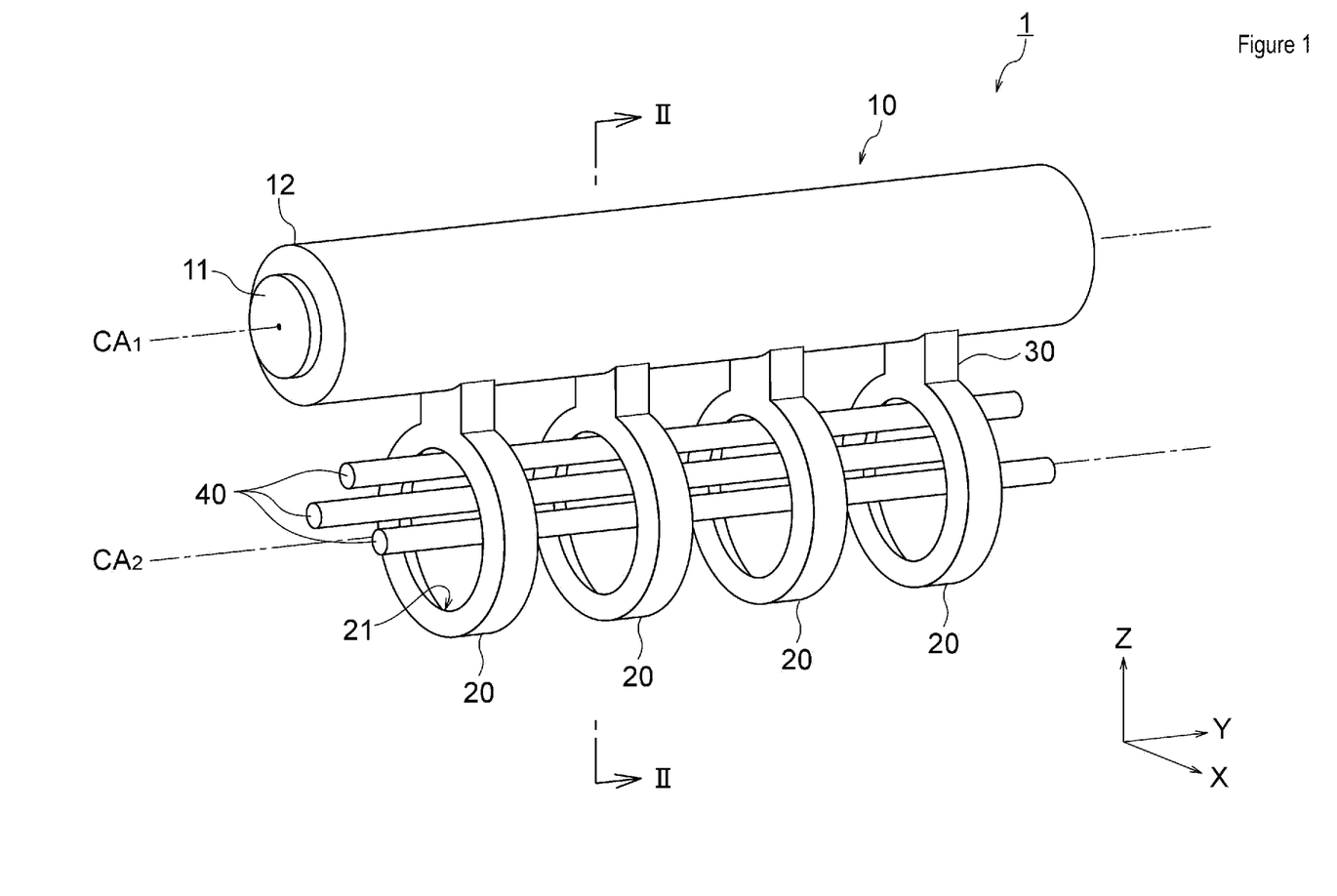
FIG. 1 is a perspective view illustrating a bundling suspension wire according to first embodiments of the present invention.
Figure 2:
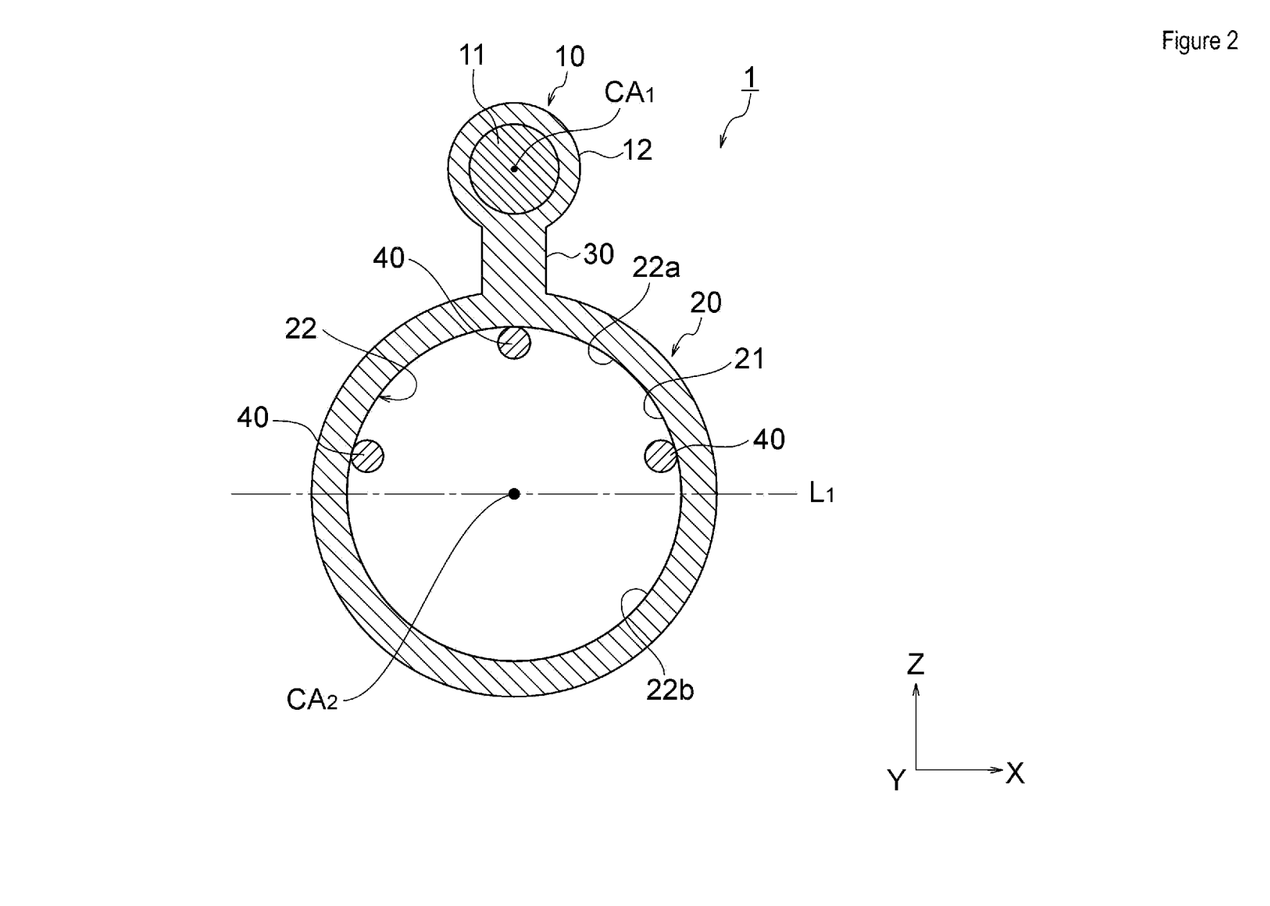
FIG. 2 is a cross-sectional view taken along the line II-II of FIG. 1.

Hereinafter, one or more embodiments of the present invention will be described with reference to the drawings. FIG. 1 is a perspective view illustrating a bundling suspension wire according to first embodiments. FIG. 2 is a cross-sectional view taken along the line II-II of FIG. 1. Incidentally, FIGS. 1 and 2 illustrate the bundling suspension wire of the state prior to laying cables.

A bundling suspension wire 1 according to one or more embodiments, for example, is a suspension wire used for suspending the cables while holding cables in a bundled state. As these cables, for example, a communication cable such as an optical fiber cable or a metal cable can be used. As shown in FIGS. 1 and 2, the bundling suspension wire 1 comprises a suspension wire 10, annular members 20, connecting portions 30, and wire threading cords 40. The annular members 20 according to one or more embodiments correspond to an example of a hanger member in the present invention.

The suspension wire 10 is, for example, an overhead wire which is suspended between utility poles or the like. As shown in FIGS. 1 and 2, the suspension wire 10 comprises a supporting wire 11 and a coat 12. The supporting wire 11 is strong enough to withstand the load applied when the supporting wire 11 is suspended. As the supporting wire 11, for example, a wire formed by twisting steel wires can be used.

The coat 12 is a tubular resin coating an outer periphery of supporting wire 11. This coat 12 is integrally formed with the connecting portions 30 and the annular members 20. As the resin constituting the coat 12, the connecting portions 30, and the annular members 20, for example, polyethylene (PE) or the like can be used.

As shown in FIG. 2, the annular member 20 according to one or more embodiments has an annular shape having a circular through hole 21 on the inside. The annular member 20 is suspended below the suspension wire 10 via the connecting portion 30. As shown in FIG. 1, the annular member 20 is disposed at a distance from the other annular member 20 along a direction of an axial $CA_1$ of the suspension wire 10 (Y direction shown in the figure). In one or more embodiments, all annular members 20 are disposed at substantially the same interval, but is not limited thereto. The interval between the annular members 20 may be different. Further, in one or more embodiments, although the shapes of all the annular members 20 are perfect circles, but are not limited thereto. For example, the shapes of the annular members 20 and the through holes 21 may be elliptical or polygonal.

In an upper area 22a of an inner circumference 22 of the annular member 20, a plurality (three in one or more embodiments) of wire threading cords 40 are fixed. The wire threading cords 40 are inserted into a plurality of through hole 21 over the distal end portion 1b (refer to FIG. 3A and FIG. 3B) to the rear-end portion 1a (see FIG. 3A and FIG. 3B) of the bundling suspension wire 1. The wire threading cords 40 are peeled off from the inner circumference 22 of the annular member 20 by being pulled during the pulling work or the like of the cable. As a material constituting the wire threading cords 40, for example, fiber-reinforced plastic (FRP) and polypropylene (PP) or the like can be used. In one or more embodiments, three wire threading cords 40 is disposed, but is not limited thereto. The wire threading cords 40 may be disposed two or more. Examples of a method of fixing the wire threading cords 40 to the annular member 20 include thermal fusion, or adhesion by using an adhesive. The wire threading cords 40 may be fixed to the annular member 20 by fitting the concave portion (i.e., groove) formed on the inner circumference 22 of the annular member 20. Further, the wire threading cords 40 may be fixed to the annular member 20 by hooking the wire threading cords 40 to the claw portion protruding from the inner circumference 22.

Incidentally, the upper region 22a is an upper (+Z side) of the area divided by the linear $L_1$ in inner circumference 22. The inner circumference 22 of the upper area 22a is disposed so as to face downward (−Z direction). Here, $L_1$ is a straight line bisecting the height of the annular member 20 along the Z direction to the upper and lower sides. The inner circumference 22 of a lower region 22b is disposed so as to face the upward direction (+Z direction). In the lower area 22b, wire threading cords 40 are not disposed. As will be described later, on the lower region 22b, the cable such as an optical fiber cable is disposed after the laying work of the cable.

The bundling suspension wire 1 described above is used in the following manner in additional laying work of the cable.

Figure 3A:
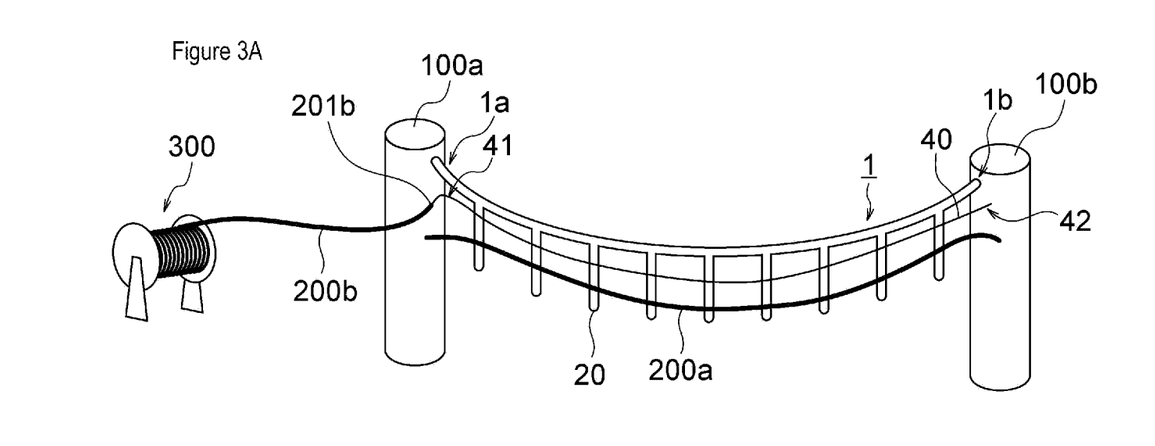
FIGS. 3A and 3B are explanatory diagrams illustrating an additional laying work by using the bundling suspension wire according to the first embodiments of the present invention.
Figure 3B:
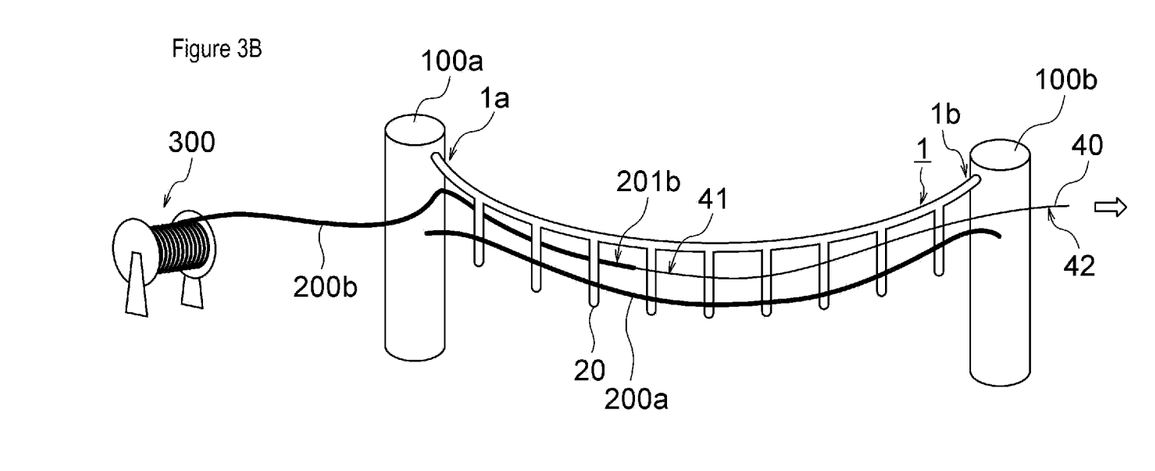

FIG. 3A is an explanatory diagram for explaining the connection work of the wire threading cord of the bundling suspension wire and the cable in the first embodiments. FIG. 3B is an explanatory diagram for explaining the pull-in work of the cable into the annular member of the bundling suspension wire in the first embodiments.

In FIGS. 3A and 3B, the rear-end portion 1a of the bundling suspension wire 1 is fixed to a utility pole 100a, and the front-end portion 1b is suspended from a utility pole 100b. A single cable 200a has been laid inside the annular members 20 of the bundling suspension wire 1.

First, a front-end portion 201b of the cable 200b is taken out from the drum 300 around which the cable 200b is wound. Then, as shown in FIG. 3A, the front-end portion 201b of the cable 200b is connected to the rear-end portion 41 of the wire threading cord 40.

Then, as shown in FIG. 3B, the front-end portion 42 of the wire threading cord 40 is pulled from the front-end portion 1b side of the bundling suspension wire 1 to peel wire threading cord 40 from the inner circumference 22 of the annular members 20 (refer to FIG. 2). Then, the front-end portion 42 of the wire threading cord 40 is further pulled to pull the wire threading cord 40 out from the annular members 20. Thus, the cable 200b is drawn from the rear-end portion 1a side of the bundling suspension wire 1 to the front-end portion 1b side.

Thereafter, the cable 200b is cut at the rear-end portion 1a of the bundling suspension wire 1. Further, the rear-end portion 41 of the wire threading cord 40 is disconnected from the front-end portion 201b of the cable 200b. As described above, the additional laying work of the cable 200b is completed.

In the bundling suspension wire 1 of one or more embodiments, the wire threading cords 40 are inserted into the through hole 21 of the annular members 20. Therefore, a new wire threading cord does not need to be pulled into the annular member 20 in the additional laying work. Therefore, it is possible to reduce the time required for the additional laying work of the cable.

Further, in the bundling suspension wire 1 of one or more embodiments, the wire threading cords 40 are fixed to the inner circumference 22 of the annular members 20. Thereby, it is possible to suppress that the remaining wire threading cords 40 are drawn to the front-end portion 1b side of the bundling suspension wire 1 by the cable 200b during the pull-in work with the wire threading cord 40. Therefore, during the next additional laying work, the rear-end portions 41 of the remaining wire threading cords 40 can be easily taken out at the rear-end portion 1a of the bundling suspension wire 1.

Furthermore, in one or more embodiments, the wire threading cords 40 are fixed to the upper area 22a of the inner circumference 22. Thereby, the remaining wire threading cord 40 described above is hard to touch the cable 200b during the pull-in work. Therefore, it is possible to suppress that the remaining wire threading cords 40 are drawn to the front-end portion 1b side of the bundling suspension wire 1 by the cable 200b during the pull-in work with the wire threading cord 40.

Second Embodiments

Figure 4:
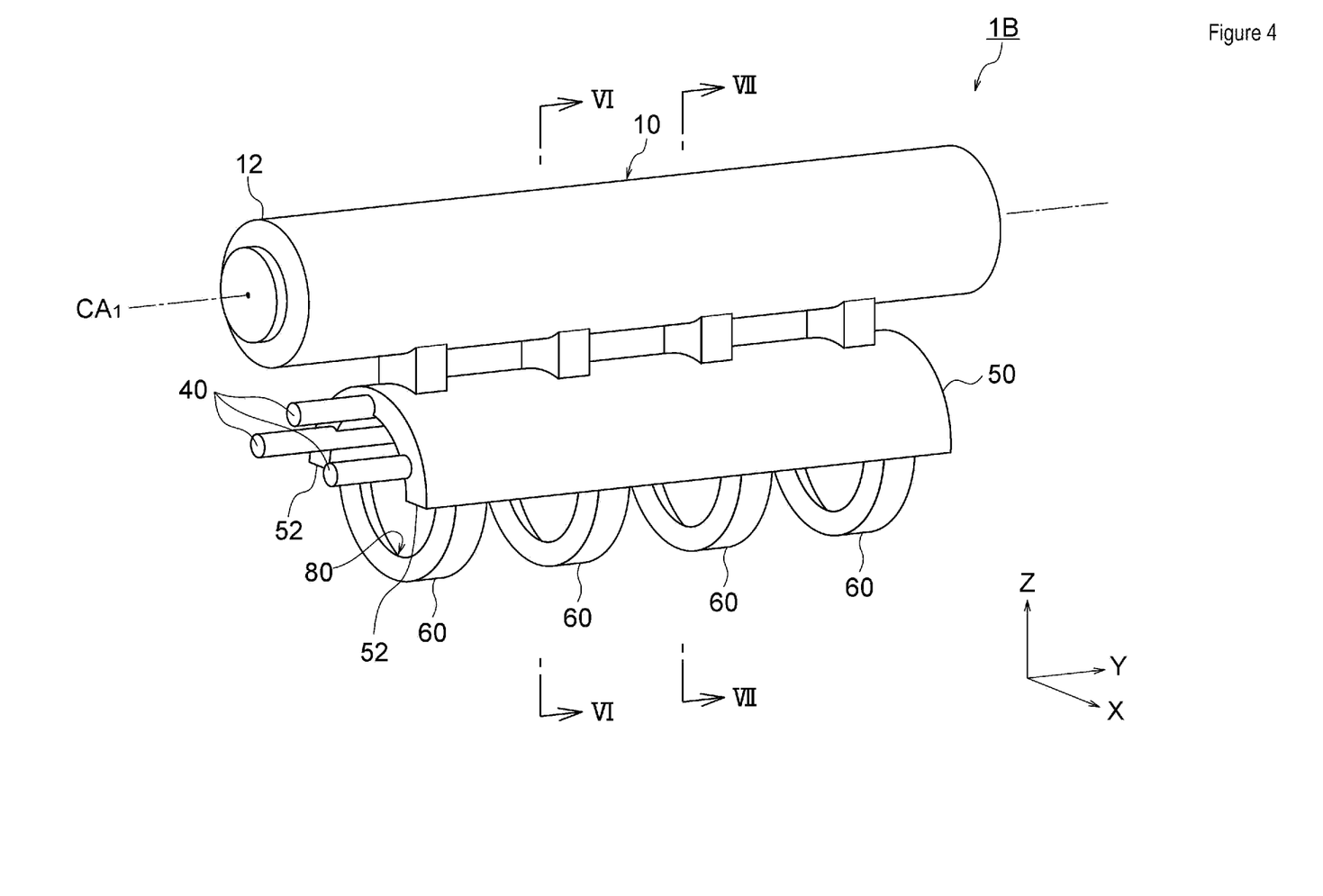
FIG. 4 is a perspective view illustrating a bundling suspension wire according to second embodiments of the present invention.
Figure 5:
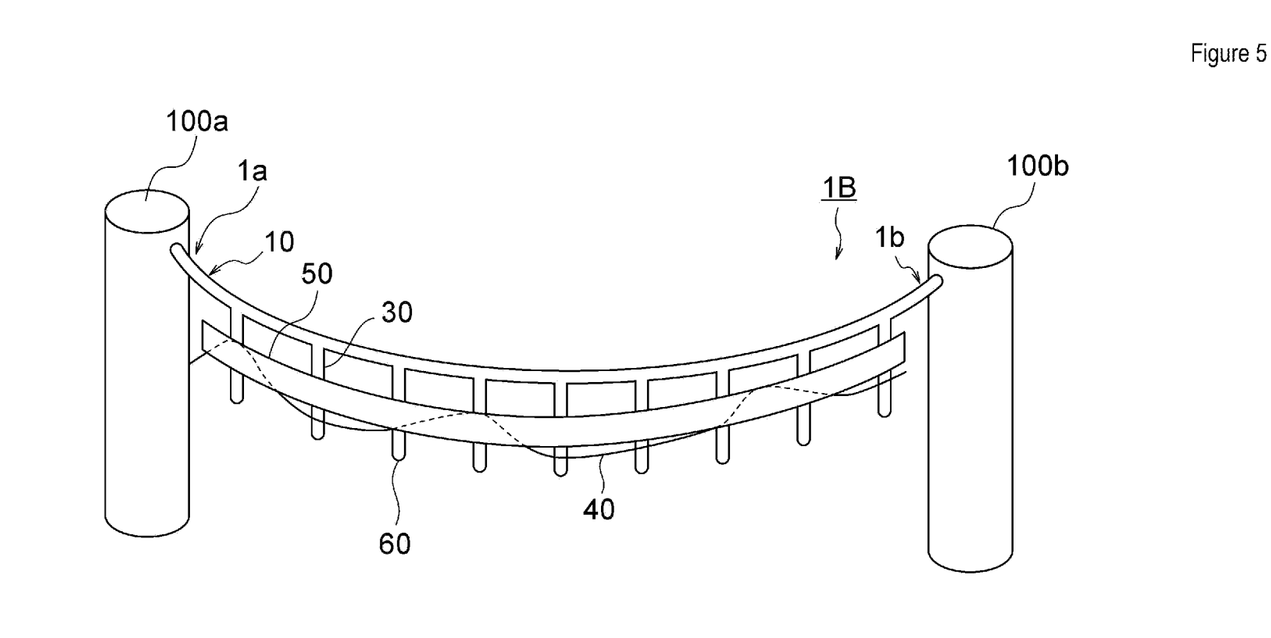
FIG. 5 is a side view illustrating a state in which the bundling suspension wire according to the second embodiments of the present invention is suspended.
Figure 6:
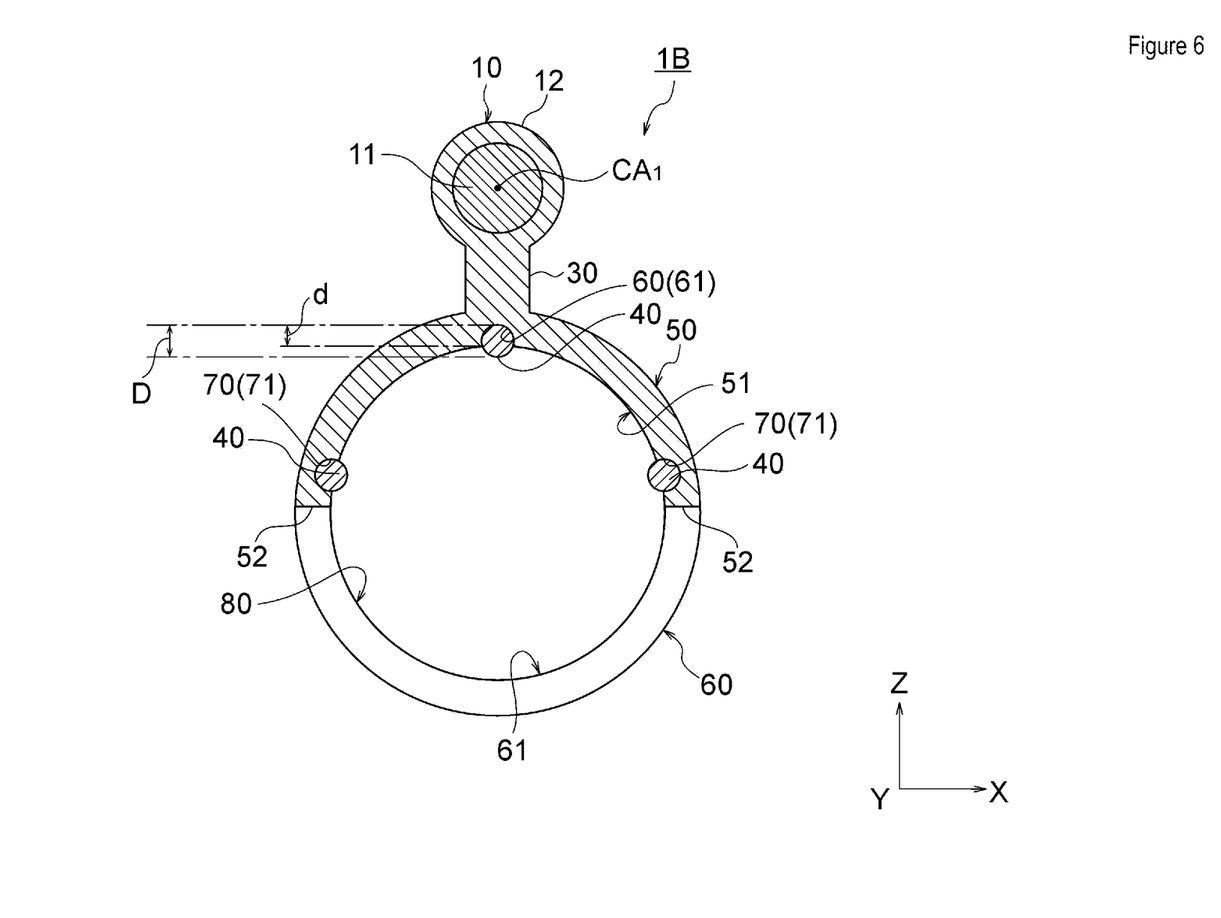
FIG. 6 is a cross-sectional view taken along the line VI-VI of FIG. 4.
Figure 7:
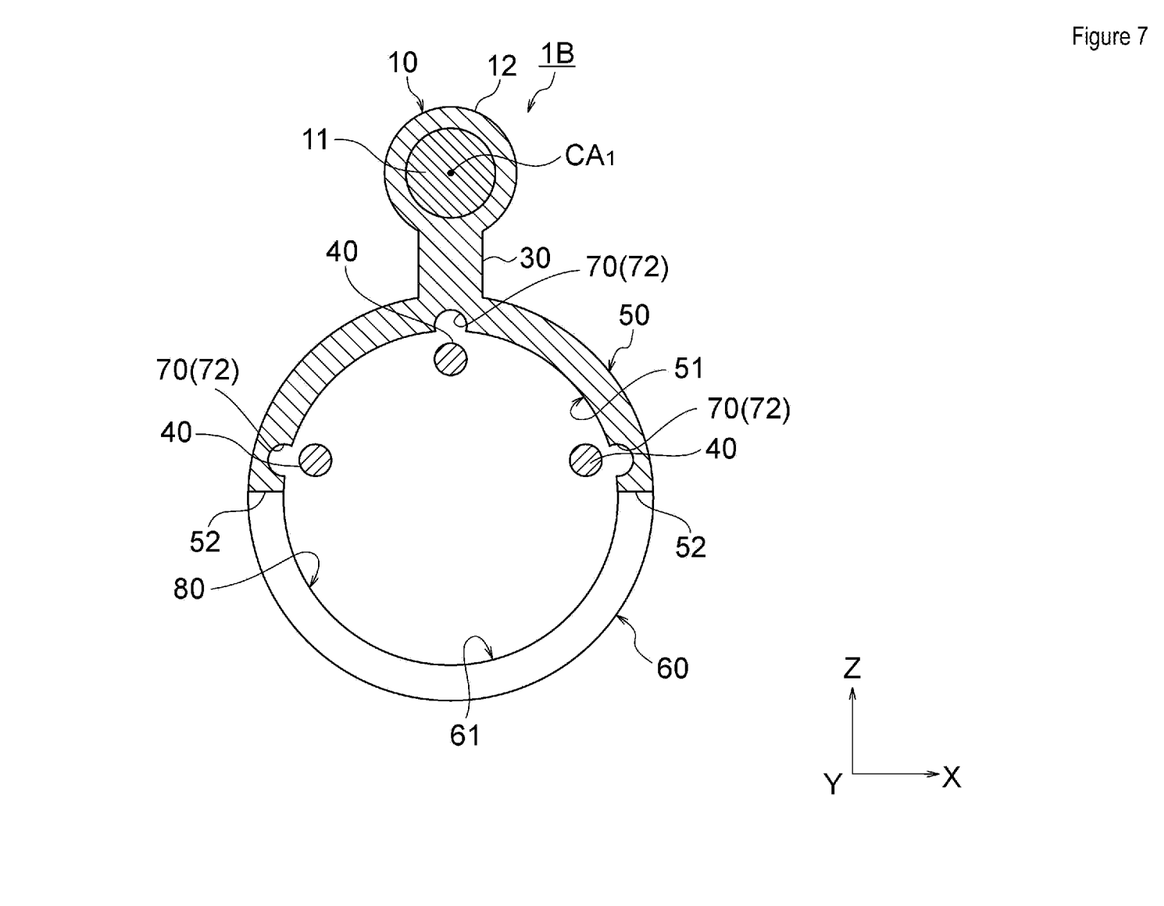
FIG. 7 is a cross-sectional view taken along the line VII-VII of FIG. 4.

FIG. 4 is a perspective view illustrating the bundling suspension wire in the second embodiments. FIG. 5 is a side view illustrating a state in which bundling suspension wire in the second embodiments is suspended. FIG. 6 is a cross-sectional view taken along the line VI-VI of FIG. 4. FIG. 7 is a cross-sectional view taken along the line VII-VII of FIG. 4.

In one or more embodiments, although the hanger member is different from the first embodiments in that the hanger member is composed of a semi-tubular member 50 and a semi-annular member 60, the other configurations are the same as the first embodiments. It will be described below only the semi-tubular member 50 and the semi-annular member 60 in the second embodiments. The same reference numerals will be given to the same components as those of the first embodiments and a description thereof will be omitted.

As shown in FIGS. 4 and 5, the semi-tubular member 50 of the bundling suspension wire 1B is suspended in the suspension wire 10 via the connecting portions 30. The semi-tubular member 50 is integrally formed with the coat 12 and the connecting portions 30 of the suspension wire 10. This semi-tubular member 50 extends in the axial direction of the suspension wire 10 (direction along the central axis $CA_1$). As shown in FIGS. 6 and 7, the semi-tubular member 50 has a semi-tubular shape which opens to the opposite side of the suspension wire 10 (−Z direction side in the figures). The shape of the semi-tubular member 50 is a cylindrical shape in one or more embodiments, but is not limited thereto. The shape of the semi-tubular member 50, for example, may be a square tube shape.

As shown in FIGS. 6 and 7, on the inner circumference 51 of the semi-tubular member 50, grooves 70 extending in the direction of the central axis $CA_1$ of the suspension wire 10 are formed. The groove 70 is continuously formed on the inner circumference 51 of the semi-tubular member 50 over the rear-end portion 1a side of the bundling suspension wire 1B (refer to FIG. 5) to the front-end portion 1b side (see FIG. 5).

As shown in FIG. 6, the groove 70 has a fitting portion in a part of the groove 70 in the longitudinal direction. The wire threading cord 40 is buried in the fitting portion 71. As shown in FIG. 7, the groove 70 also has a non-fitting portion 72 in a part of the groove 70 in the longitudinal direction. The wire threading cord 40 is not buried in the non-fitting portion 72. In one or more embodiments, although not particularly limited, as shown in FIG. 5, a part of the wire threading cord 40 is deformed by bending or pulling, and is dropped from the groove 70 to form the non-fitting portion 72. In one or more embodiments, the fixing strength of the wire threading cord 40 in non-fitting portion 72 is 0. Therefore, the fixing strength of the wire threading cord 40 in the non-fitting portion 72 and the fixing strength of the wire threading cord 40 in the fitting portion 71 are different from each other. Here, the fixing strength refers to a force required to disengage the wire threading cord 40 from one fitting portion 71. Incidentally, the fitting portion 71 in one or more embodiments corresponds to an example of the first portion in the present invention. The non-fitting portion 72 in one or more embodiments corresponds to an example of a second portion in the present invention. The case that the fixing strength of the first portion and the second portion are different in one or more embodiments of the present invention includes the case that one of the fixing strengths is 0 as in fitting portion 71 and non-fitting portion 72 of one or more embodiments.

The fitting portion 71 and the non-fitting portion 72 are adjoining to each other in the longitudinal direction. In one or more embodiments, groove 70 has a plurality of fitting portion 71, and a plurality of non-fitting portion 72. Each fitting portion 71 is disposed between the non-fitting portions 72. Therefore, the wire threading cord 40 is intermittently fixed by the groove 70. In one or more embodiments, fitting portion 71 is arranged at regular intervals. For example, the fitting portions 71 may be disposed every 10 m. Incidentally, the distance between the fitting portions 71 may not be constant.

The depth d of the groove 70 may be ½ or more with respect to the diameter D of the wire threading cord 40 ($d/D \geq ½$). Thus, it is possible to fix the wire threading cord 40 more reliably to the groove 70 by more than half of the wire threading cord 40 is buried in the groove 70.

The depth d of the groove 70 is not particularly limited, but the depth d may be 0.5 mm to 10 mm ($0.5 \text{ mm} \leq d \leq 10 \text{ mm}$). The diameter D of the wire threading cord 40 is not particularly limited, but the diameter D may be 1 mm to 10 mm ($1 \text{ mm} \leq D \leq 10 \text{ mm}$).

On the bottom end surface 52 of the semi-tubular member 50, the semi-annular members 60 are disposed. The semi-annular members 60 are spaced along the central axis $CA_1$ of the suspension wire 10. The semi-annular members 60 are integrally formed with the semi-tubular member 50. In one or more embodiments, all semi-annular members 60 are disposed at substantially the same interval, but is not limited thereto. The interval between the semi-annular members 60 may be different.

The semi-annular member 60 has a semi-annular shape protruding toward the opposite side (−Z direction side) to the suspension wire 10 from the semi-tubular member 50. Both ends of the semi-annular member 60 are connected to the end of the semi-tubular member 50 so that the semi-annular member 60 straddles the opening of the semi-tubular member 50. The inner diameter of the semi-annular member 60 is substantially the same as the inner diameter of the semi-tubular member 50. Thus, the semi-annular member 60 and the semi-tubular member 50 are not particularly limited, but they form a single circle. Therefore, in one or more embodiments, the through hole 80 extending along the central axis $CA_1$ of the suspension wire 10 is formed by the semi-annular member 60 and the above semi-tubular member 50. Then, similarly to the first embodiments described above, the cables are disposed on the inner circumference 61 of the semi-annular member 60.

In one or more embodiments, the bundling suspension wire 1B comprises the semi-tubular member 50. Thereby, it is possible to protect the wire threading cord 40 fixed to the inner circumference 51 of the semi-tubular member 50 from ultraviolet rays, wind, and rain. Therefore, it is possible to restrain the deterioration of the wire threading cord 40.

In one or more embodiments, similarly to the first embodiments, it is also possible to reduce the time required for the additional laying work of the cable.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the first embodiments described above, the wire threading cords 40 are fixed to the inner circumference 22 of all the annular members 20, but is not limited thereto. In the first embodiments, the wire threading cord 40 may not be fixed to some of the annular members 20.

In the second embodiments described above, the groove 70 is continuously formed on the inner circumference 51 of the semi-tubular member 50, but is not limited thereto. For example, the grooves 70 may be intermittently formed on the inner circumference 51 of the semi-tubular member 50. In this case, the groove 70 may be formed only in a part for fixing the wire threading cord 40. Further, the depth of the groove 70 may be varied in the longitudinal direction. A portion of the groove 70 having a deep depth has the stronger fixing strength of the wire threading cord 40 than that of a portion of the groove 70 having a shallow depth. It is possible to adjust the balance between the reliable fixing of the wire threading cord 40 and ease of removal of the wire threading cord 40 during use by adjusting the ratio of the deep portion and the shallow portion.

In the second embodiments described above, the wire threading cord 40 is fixed to the semi-tubular member 50 by using the groove 70, but is not limited thereto. For example, as in the first embodiments, the wire threading cord 40 may be fixed by thermal fusion or adhesion using an adhesive.

The configurations of the hanger member are not limited to the configurations of the first and second embodiments. For example, the hanger member may be a spiral-shaped member disposed along the axial $CA_1$ of the suspension wire 10. In this case, the wire threading cord 40 is inserted into a through hole formed inside the spiral-shaped member.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS 1, 1B . . . bundling suspension wire
1a . . . Rear-end portion
1b . . . Front-end portion
10 . . . Suspension wire
11 . . . Supporting wire
12 . . . Coat
20 . . . Annular member
21 . . . Through hole
22 . . . Inner circumference
22a . . . Upper region
22b . . . Lower region
30 . . . Connecting portion
40 . . . Wire threading cord
41 . . . Rear-end portion
42 . . . Front-end portion
50 . . . Semi-tubular member
51 . . . Inner circumference
52 . . . Lower end surface
60 . . . Semi-annular member
61 . . . Inner circumference
70 . . . Groove
71 . . . Fitting portion
72 . . . Non-fitting portion
80 . . . Through hole
100a, 100b . . . Utility poles
200a, 200b . . . Cables
201b . . . Front end portion
300 . . . Drum

The invention claimed is:

1. A bundling suspension wire comprising:
a suspension wire that comprises:
a supporting wire; and
a coat coating the supporting wire;
a hanger member that is suspended from the suspension wire and into which a cable is configured to be inserted; and
wire threading cords that are inserted into the hanger member, wherein
the hanger member comprises annular members each having a through hole into which the cable is configured to be inserted,
the wire threading cords are fixed to grooves formed on an inner circumference of the through hole of each of the annular members.

2. The bundling suspension wire according to claim 1, wherein the annular members are spaced along an axial direction of the suspension wire and are integrally formed with the coat of the suspension wire.

3. The bundling suspension wire according to claim 2, wherein the wire threading cords are fixed to a half area adjacent to the suspension wire in the inner circumference of the through hole of each of the annular members.

4. A bundling suspension wire comprising:
a suspension wire that comprises:
a supporting wire; and
a coat coating the supporting wire;
a hanger member that is suspended from the suspension wire and into which a cable is configured to be inserted; and
wire threading cords that are inserted into the hanger member, wherein
the hanger member comprises:
a semi-tubular member that:
extends along an axial direction of the suspension wire, and
opens on a side opposite to the suspension wire; and
semi-annular members that:
protrude from the semi-tubular member to the side opposite to the suspension wire, and
are spaced along the axial direction of the suspension wire,
the semi-tubular member and the semi-annular members are integrally formed with the coat of the suspension wire, and
the wire threading cords are fixed to an inner circumference of the semi-tubular member.

5. The bundling suspension wire according to claim 4, wherein
the semi-tubular member comprises grooves that:
extend along the axial direction of the suspension wire, and
are disposed on the inner circumference of the semi-tubular member, and
the grooves each comprise:
a first portion to which one of the wire threading cords is fixed; and
a second portion that has a fixing strength of the one of the wire threading cords different from a fixing strength of the one of the wire threading cords of the first portion.

* * * * *